United States Patent [19]

Glezer et al.

[11] Patent Number: 5,494,402
[45] Date of Patent: Feb. 27, 1996

[54] LOW THERMAL STRESS CERAMIC TURBINE NOZZLE

[75] Inventors: Boris Glezer, Del Mar; Hamid Bagheri; Aaron R. Fierstein, both of San Diego, all of Calif.

[73] Assignee: Solar Turbines Incorporated, San Diego, Calif.

[21] Appl. No.: 242,792

[22] Filed: May 16, 1994

[51] Int. Cl.⁶ .................................................. F01D 5/14
[52] U.S. Cl. ............................ 415/115; 415/139; 415/176
[58] Field of Search ................................. 415/115, 116, 415/139, 176, 200, 209.4; 416/241 B

[56] References Cited

U.S. PATENT DOCUMENTS

| 2,501,614 | 3/1950 | Price | 415/115 |
|---|---|---|---|
| 2,563,269 | 8/1951 | Price | 415/115 |
| 2,847,185 | 8/1958 | Petrie et al. | 415/116 |
| 3,291,447 | 12/1966 | Brandon | 415/176 |
| 3,619,077 | 11/1971 | Wite | 416/241 B |
| 3,694,102 | 9/1972 | Conrad | 415/115 |
| 4,768,924 | 9/1988 | Carrier et al. | 415/200 |
| 5,142,859 | 9/1992 | Glezer et al. | 415/115 |
| 5,207,556 | 5/1993 | Frederick et al. | 415/116 |
| 5,269,651 | 12/1993 | Ostermeir et al. | 415/139 |
| 5,380,154 | 1/1995 | Norton et al. | 415/200 |

FOREIGN PATENT DOCUMENTS

1507991  9/1989  U.S.S.R. ............... 416/241 B

Primary Examiner—Edward K. Look
Assistant Examiner—Mark Sgantzos
Attorney, Agent, or Firm—Larry G. Cain

[57] ABSTRACT

A turbine nozzle vane assembly having a preestablished rate of thermal expansion is positioned in a gas turbine engine and being attached to conventional metallic components. The metallic components having a preestablished rate of thermal expansion being greater than the preestablished rate of thermal expansion of the turbine nozzle vane assembly. The turbine nozzle vane assembly includes an outer shroud and an inner shroud having a plurality of vanes therebetween. Each of the plurality of vanes have a device for heating and cooling a portion of each of the plurality of vanes. Furthermore, the inner shroud has a plurality of bosses attached thereto. A cylindrical member has a plurality of grooves formed therein and each of the plurality of bosses are positioned in corresponding ones of the plurality of grooves. The turbine nozzle vane assembly provides an economical, reliable and effective ceramic component having a preestablished rate of thermal expansion being greater than the preestablished rate of thermal expansion of the other component.

19 Claims, 4 Drawing Sheets

Fig. 1

Fig_2_

Fig_3_

5,494,402

LOW THERMAL STRESS CERAMIC TURBINE NOZZLE

The Government of the United States of America has rights in this invention pursuant to Contract No. DE-AC02-92CE40960 awarded by the U.S. Department of Energy.

TECHNICAL FIELD

This invention relates generally to a gas turbine engine and more particularly to a turbine nozzle being made of a ceramic material.

BACKGROUND ART

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a nozzle which directs the hot gas to a turbine blade, delivering up some of its energy to drive the turbine and produce mechanical power.

In order to increase efficiency the nozzle has a preestablished aerodynamic contour. The axial turbine consists of one or more stages, each employing one row of stationary nozzle guide vanes and one row of moving blades mounted on a turbine disc. The aerodynamically designed nozzle guide vanes direct the gas against the turbine blades producing a driving torque and thereby transferring kinetic energy to the blades.

The gas typically entering through the nozzle is directed to the turbine at a rotor entry temperature from 850 degrees to at least 1200 degrees Centigrade. Since the efficiency and work output of the turbine engine are related to the entry temperature of the incoming gases, there is a trend in gas turbine engine technology to increase the gas temperature. A consequence of this is that the materials of which the nozzle vanes and blades are made assume ever-increasing importance of elevated temperature capability.

Historically, nozzle guide vanes and blades have been made of metals such as high temperature steels and, more recently, nickel/cobalt alloys. Furthermore, it has been found necessary to provide internal cooling passages in order to prevent oxidation. It has been found that ceramic coatings can enhance the heat resistance of nozzle guide vanes and blades. In specialized applications, nozzle guide vanes and blades are being made entirely of ceramic, thus, accepting even higher gas entry temperatures.

Ceramic materials are superior to metal in high-temperature capability and have a low linear thermal expansion coefficient. But, on the other hand, ceramic materials have negative drawbacks such as low fracture toughness.

When a ceramic structure is used to replace a metallic part or is combined with a metallic one, it is necessary to avoid excessive thermal stresses generated by an uneven temperature distribution or the difference between their linear thermal expansion coefficients. The ceramic components' different chemical composition, physical property and coefficient of thermal expansion to that of a metallic supporting structure result in undesirable stresses. A major portion of these stresses is thermal stress, which will be set up within the nozzle guide vanes and/or blades and between the nozzle guide vanes and/or blades and their supports when the engine is operating.

Furthermore, conventional nozzle and blade designs which are made from a metallic material are capable of absorbing or resisting these thermal stresses. The chemical composition of ceramic nozzles and blades do not have the desired characteristics to absorb or resist the thermal stresses. If the stress occurs in a tensile stress zone of the nozzle or blade a catastrophic failure may occur.

The present invention is directed to overcome one or more of the problems as set forth above.

Disclosure of the Invention

In one aspect of the invention, a nozzle guide vane assembly includes an outer shroud defining an inner surface, an inner shroud positioned radially within said outer shroud and defining a first end, a second end, an inner surface and an outer surface. The assembly further includes a plurality of nozzle vanes being interposed the inner surface of the outer shroud and the outer surface of the inner shroud. A slot is positioned in each of the plurality of nozzle vanes. The slot has a length extending radially between the inner surface of the outer shroud and the outer surface of the inner shroud.

In another aspect of the invention, a turbine nozzle vane assembly is comprised of an outer shroud defining an inner surface, an inner shroud positioned radially within the outer shroud and defining an outer surface. A plurality of nozzle vanes define a first end portion attached to the inner surface of the outer shroud, a second end portion attached to the outer surface of the inner shroud and a center portion defined between the first end portion and the second end portion. A means for heating the first end portion and the second end portion and a means for cooling the center portion is included in the turbine nozzle vane assembly.

BEST MODE FOR CARRYING OUT THE INVENTION

Figure 1:
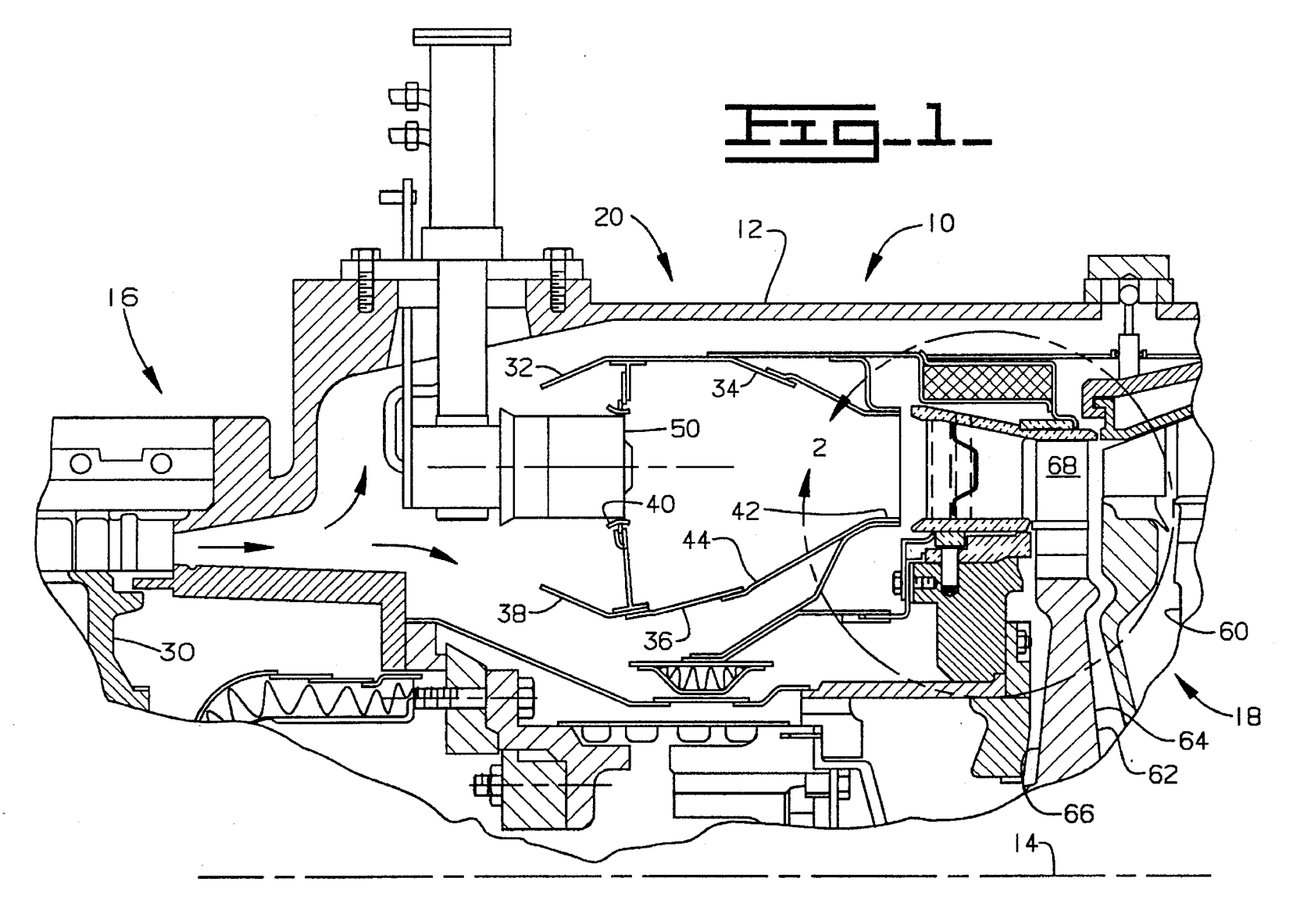
FIG. 1 is a partial side view of a gas turbine engine shown in section for illustration convenience embodying the present invention with portions.

Referring to FIG. 1, a gas turbine engine 10 is shown. The gas turbine engine 10 has an outer housing 12 having a central axis 14. Positioned in the housing 12 and centered about the axis 14 is a compressor section 16, a turbine section 18 and a combustor section 20 positioned operatively between the compressor section 16 and the turbine section 18.

When the engine 10 is in operation, the compressor section 16, which in this application includes an axial staged compressor 30 or, as an alternative, a radial compressor or any source for producing compressed air, causes a flow of compressed air which has at least a part thereof communicated to the combustor section 20 and another portion used for cool components of the gas turbine engine 10. The combustor section 20, in this application, includes an annular combustor 32. The combustor 32 has a generally cylindrical outer shell 34 being coaxially positioned about the central axis 14, a generally cylindrical inner shell 36, an inlet end 38 having a plurality of generally evenly spaced openings 40 therein and an outlet end 42. In this application, the combustor 32 is constructed of a plurality of generally conical segments 44. Each of the openings 40 has an injector 50 positioned therein. As an alternative to the annular combustor 32, a plurality of can type combustors could be incorporated without changing the essence of the invention.

The turbine section 18 includes a power turbine 60 having an output shaft, not shown, connected thereto for driving an accessory component, such as a generator. Another portion of the turbine section 18 includes a gas producer turbine 62 connected in driving relationship to the compressor section 16. The gas producer turbine 62 includes a turbine assembly 64 being rotationally positioned about the central axis 14. The turbine assembly 64 includes a disc 66 having a plurality of blades 68 attached therein in a conventional manner.

Figure 2:
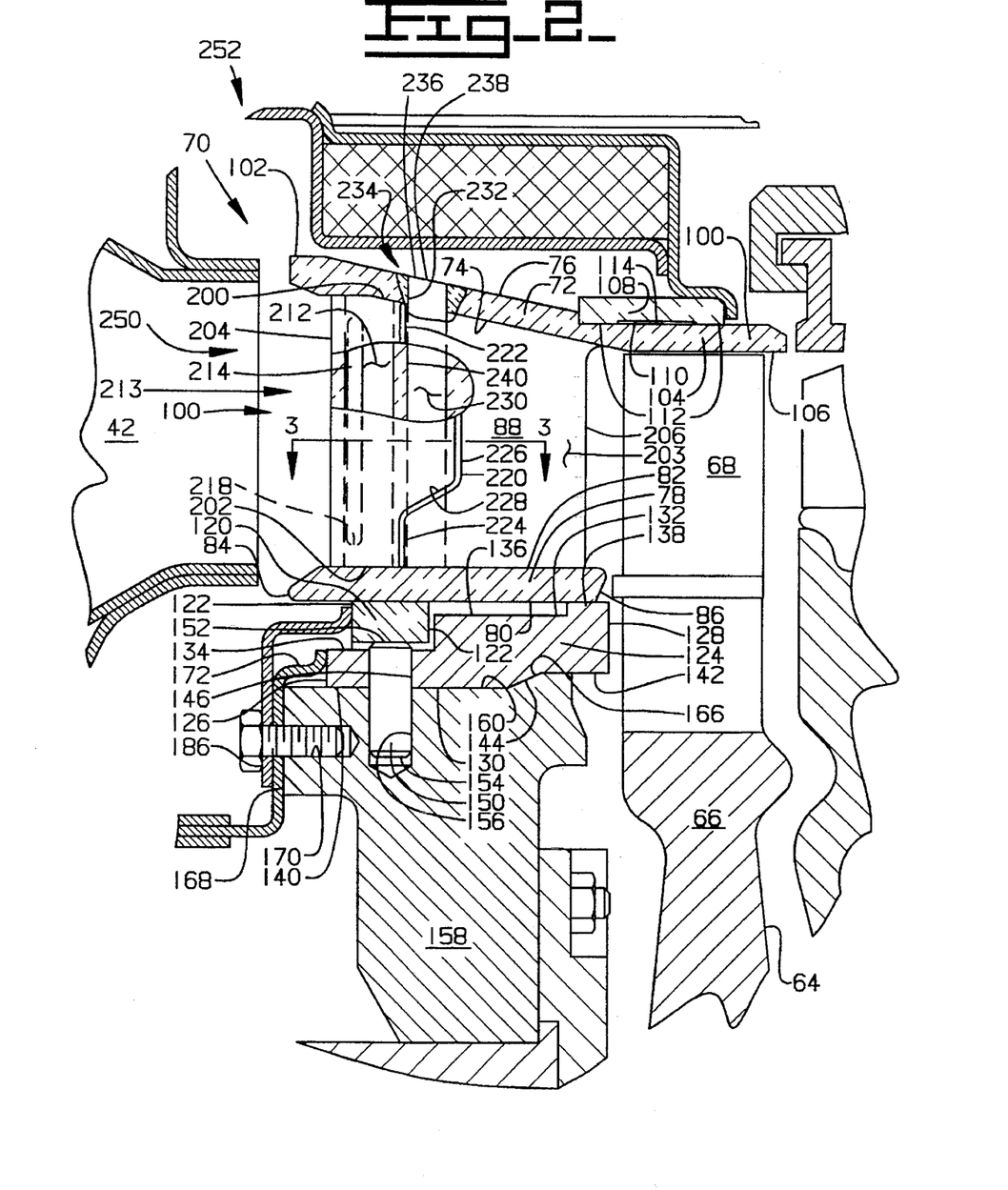
FIG. 2 is an enlarged sectional view of a portion of the gas turbine engine having a ceramic nozzle guide vane assembly as taken generally within line 2 of FIG. 1.

As best shown in FIG. 2, positioned adjacent the outlet end 42 of the combustor 32 and in flow receiving communication therewith is a turbine nozzle vane assembly 70. The turbine nozzle vane assembly 70 is made of a ceramic material having a relative low rate of thermal expansion as compared to the metallic components of the engine 10. The turbine nozzle vane assembly 70 includes an outer shroud 72 defining a radial inner surface 74 and a radial outer surface 76, an inner shroud 78 defining a radial inner surface 80, a radial outer surface 82, a first end 84 and a second end 86, and a plurality of vanes 88 interposed the radial inner surface 74 of the outer shroud 72 and the radial outer surface 82 of the inner shroud 78. In this application, the outer shroud 72, the inner shroud 78 and the plurality of vanes 88 are fixedly connected one to another. Furthermore, in this application, the turbine nozzle vane assembly 70 includes a plurality of segments 100 of which only one is shown, assembled together to form a ring shaped structure 102 center about the central axis 14. As an alternative, the outer shroud 72 and/or the inner shroud 78 could be a single piece. Additionally, the plurality of vanes 88 could be cantilevered from either of the outer shroud 72 or the inner shroud 78.

The outer shroud 72, in this application, includes a tail portion 104 which extends axially in spaced relation along the turbine blade 68 of the turbine assembly 64. The tail portion 104 is radially spaced from the blades 68 a preestablished distance forming a tip clearance 106. To insure the proper tip clearance 106 between the blades 68 and the tail portion 104 a continuous ring 108 is positioned about a portion of the outer surface 76 of the outer shroud 72 in contacting relationship. The continuous ring 108 retains the plurality of segments 100 in a fixed circular array about the turbine blades 68 and the central axis 14. The continuous ring 108 defines an inner surface 110 having a pair of leg members 112 extending therefrom at each end of the continuous ring 108 and a cavity or void 114 is formed therebetween.

Figure 3:
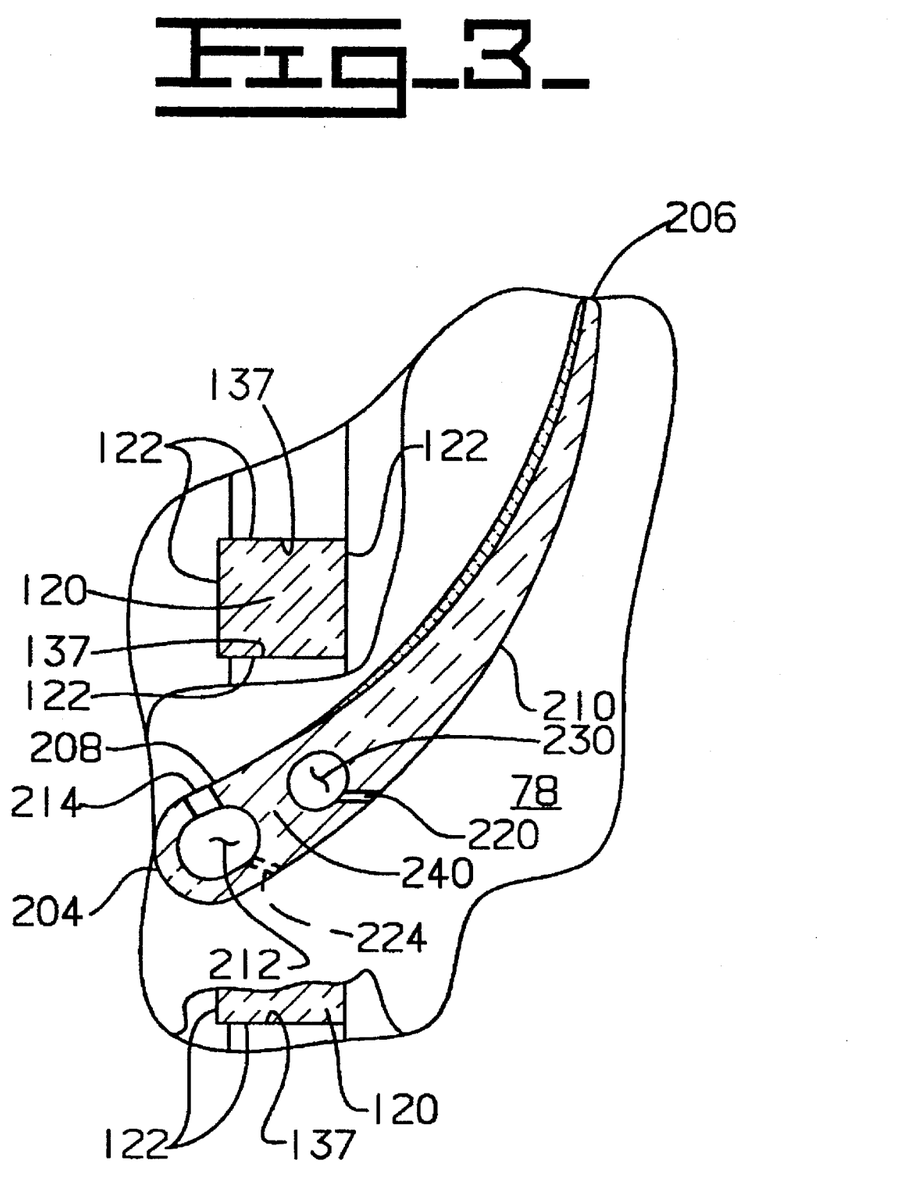
FIG. 3 is an enlarged sectional view of a nozzle vane taken along line 3—3 of FIG. 2.

As further shown in FIG. 2, the inner shroud 78 has a plurality of bosses 120 attached to the inner surface 80 which extend therefrom a preestablished distance. As best shown in FIG. 3, a cross-section taken axially through the bosses discloses a generally square or rectangular configuration being formed by a plurality of sides 122. Positioned radially inward of the inner shroud 78 is a cylindrical member 124 defining a first side 126, a second side 128, an inner surface 130 and an outer surface 132. A first step 134 defines a portion of the outer surface 132. The first step 134 extends from the first side 126 toward the second side 128, a second step 136 further defines another portion of the outer surface 132 and extends intermediate the first side 126 and the second side 128. The second step 136 has a plurality of grooves 137 therein. In this application, one of the plurality of grooves 137 is provided for each of the bosses 120 and generally provides a line to line fit therebetween. Each of the grooves 137 extend generally parallel to the central axis 14 and end prior to exiting the second side 128. A third step 138 is defined on the outer surface 132 and extends from the second side 128 toward the first side 126. The third step 138 is generally in contacting relationship with the inner surface 80 of the inner shroud 78 retaining the plurality of segments 100 in a fixed circular array about the central axis 14.

The inner surface 130 of the cylindrical member 124 has a first cylindrical portion 140 extending from the first side 126 toward the second side 128. A second cylindrical portion 142 being radially larger than the first cylindrical portion 140 extends from the second side 128 toward the first side 126. A transition portion 144 has an angle from the first cylindrical portion 140 outwardly toward the second cylindrical portion 142. The transition portion 144 connects the first cylindrical portion 140 with the second cylindrical portion 142.

A plurality of through holes 146 are positioned in the cylindrical member 124 and extend from the inner surface 130 to the outer surface 132. A plurality of pins 150 have a first end 152 positioned in corresponding ones of the plurality of the through holes 146. A second end 154 of each of the plurality of pins 150 is positioned in corresponding ones of a plurality of holes 156 within a stator diaphragm 158. The stator diaphragm 158 is attached to the gas turbine engine 10 in a conventional manner. In this application, the stator diaphragm 158 is made of a metallic material having a thermal expansion rate which is higher than the thermal expansion rate of the ceramic turbine nozzle vane assembly 70. The stator diaphragm 158 further includes a outer radial surface 160 having an angled portion 166. The stator diaphragm 158 further includes a side 168 having a plurality of threaded holes 170 therein. The transition portion 144 of the cylindrical member 124 contacts the angled portion 166 of the stator diaphragm 158 and generally prevents axial movement of the cylindrical member 124 in a first direction toward the turbine assembly 64. A generally cylindrical first retainer 172 is attached to the side 168 of the stator diaphragm 158. The first retainer 172 is in close to contacting relationship with the first side 126 of the cylindrical member 124 and generally prevents axial movement of the cylindrical member 124 toward the side 168 of the stator diaphragm 158. A generally cylindrical second retainer 186 is attached to the side 168 of the stator diaphragm 158. The second retainer 186 generally prevents axial movement of the plurality of bosses 120 and inner shroud 78 toward the side 168 of the stator diaphragm 158.

In this application, each of the plurality of vanes 88 interposed the outer shroud 72 and the inner shroud 78 have a generally hollow vane configuration. Each of the plurality of vanes 88 define a first end portion 200 adjacent the inner surface 74 of the outer shroud 72, a second end portion 202 adjacent the outer surface 82 of the inner shroud 78 and a central portion 203 intermediate the first and second end portions 200, 202. As best shown in FIG. 3, each of the plurality of vanes 88 includes a leading edge portion 204 positioned adjacent the outlet end 42 of the combustor 32 and a trailing edge portion 206 positioned adjacent the turbine assembly 64. As best shown in FIG. 3, interposed the leading edge portion 204 and the trailing edge portion 206 is a pressure or concave side 208 and a suction or convex side 210 each having a preestablished thickness. Defined within each of the plurality of vanes 88 and forming the hollow portion is a first gallery 212 being in communication with the mainstream hot gases from the combustor 32 by way of a means 213 for controlling the flow of mainstream hot gases into the first gallery 212. The means 213 for controlling is interposed the gallery 212 and the flow of mainstream hot gases. The means 213 for controlling the flow of mainstream hot gases, in this application, is an opening 214 or a slot or a plurality of holes having a generally slot type configuration. In this application, the opening 214 extends along a portion of the length of the concave side 210 of each vane 88. The opening 214 is generally centered radially along the length of each vane 88. As an alternative, the length of the opening 214 could vary in length along the length of each of the plurality of vanes 88. Positioned at each end of the opening 214 is an arcuate end 218. A slot 220 is positioned in the convex side 210 and extends generally the entire length of the vane 88. As best shown in FIG. 2, the slot 220 includes an outer radial portion 222 extending inwardly from the outer shroud 72, an inner radial portion 224 extending outwardly from the inner shroud 78, a central radial portion 226 intermediate the outer radial portion 222 and the inner radial portion 224 and a pair of generally axial portions 228 connecting each of the outer radial portion 222 with the central radial portion 226 and the inner radial portion 224 with the central radial portion 226. The central radial portion 226 is axially positioned intermediate the outer radial portion 222 and the inner radial portion 224 and the trailing edge portion 206. The outer radial portion 222 and the inner radial portion 224 are in communication with the first gallery 212. The central radial portion 226 is in communication with a second gallery 230. The second gallery 230 extends through at least a portion of the length of the vane 88 and is in communication with the cooling air from the compressor section 16. The second gallery 230 communicates with the cooling air from the compressor section 16 by way of a passage 232. A means 234 for controlling the flow of cooling air to the second gallery 230 is interposed the second gallery 230 and the supply of cooling air. The means 234 for controlling the flow of cooling air, in this application, is an orifice or an opening 236 positioned at an inlet 238 of the second gallery 230. As an alternative, a valve or any type of mechanism could be used to control or vary the flow of cooling air into the second gallery 230. A wall 240 is interposed the first gallery 212 and the second gallery 230 and extend radially the entire length of the vane 88. The pair of generally axial portions 228 communicate with the first gallery 212 and the second gallery 230 and extend across the wall 240. The ends of the slot 220 have an arcuate end being similar in structure to that of the arcuate end 218 at each of its ends. In this application, the arcuate ends 218 form a portion of the inner surface 74 of the outer shroud 72 and the outer surface 82 of the inner shroud 78. The opening 214 in the concave side 208 is positioned forward of the slot 220 in the convex side 210 toward the outlet end 42 of the combustor 32. Furthermore, the slot 220 is skewed or angled in the convex sides 210 from the first gallery 212 and the second gallery 230 outwardly and from the leading edge portion 204 toward the trailing edge portion 206. For example, the included angle between the convex side 210 and the slot 220 is between about 45 and 15 degrees. In this application, the angle along the outer radial portion 222 and the inner radial portion 224 is between about 45 and 30 degrees whereas the angle along the central radial portion 226 is between about 30 and 15 degrees. Each of the opening 214 and the slot 220 has a preestablished cross-sectional area which is controlled by its width and the length. In this application, the opening 214 has a length which extends axially between the inner surface 74 of the outer shroud 72 and the outer surface 82 of the inner shroud 78.

Figure 4:
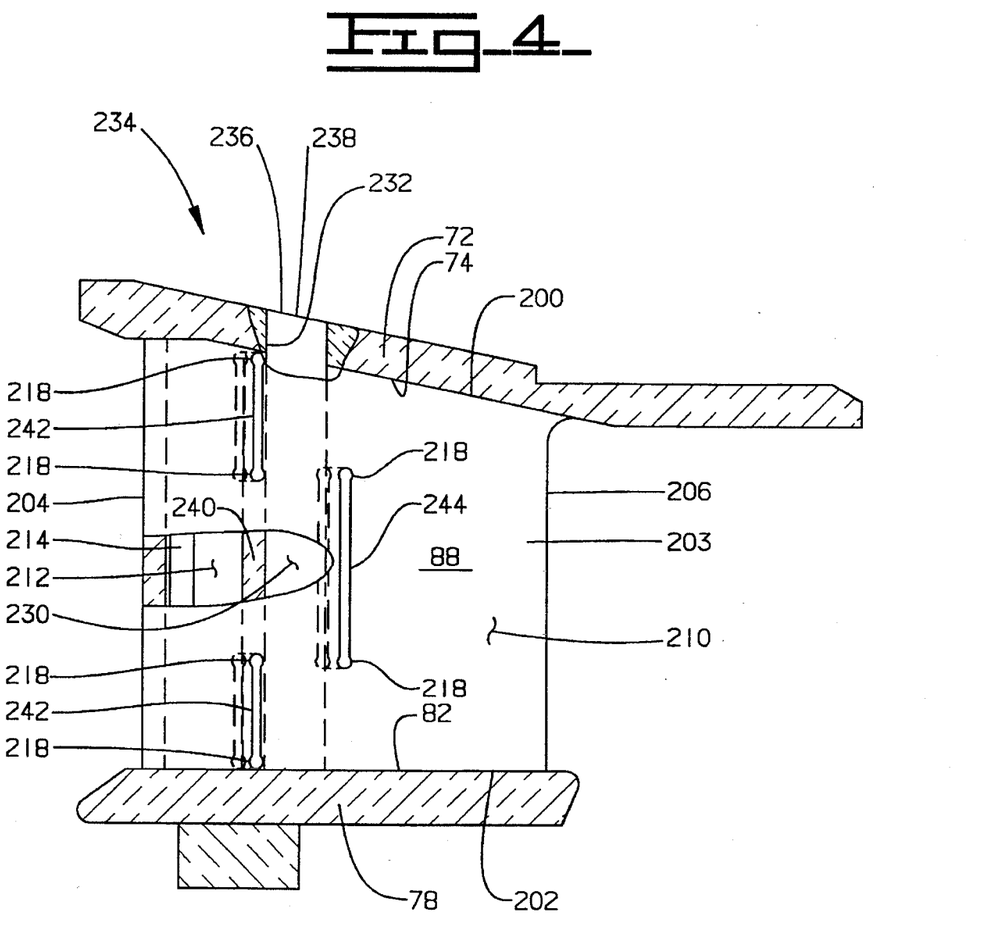
FIG. 4 is an enlarged sectional view of an alternative nozzle vane.

As best shown in FIG. 4, an alternate vane 88 having the concave side 208, not shown, the convex side 210, the first gallery 212 and the second gallery 230 is shown. The first gallery 212, being in communication with the mainstream hot gas and the second gallery 230 being in communication with the cooling air from the compressor section 16. The first gallery 212 includes a pair of slots 242 being in communication therewith. The pair of slots 242 are positioned in the convex side 210 near the leading edge portion 204. One of the pair of slots 242 extends from the inner surface 74 of the outer shroud 72 radially inward toward the center portion 203 of the vane 88 and the other one of the pair of slots 242 extends from the outer surface 82 of the inner shroud 78 radially outward toward the center portion 203 of the vane 88. Each end of the pair of slots 242 has the arcuate end 218. The pair of slots 242 are angled in the convex side from the leading edge portion 204 toward the trailing edge portion 206.

The second gallery 230 includes a central slot 244 being in communication therewith. The central slot 244 is positioned in the center portion 203 of the vane 88 in the concave side 208 intermediate the pair of slots 242 and the trailing edge portion 206. The central slot 244 extends radially between the inner surface 74 of the outer shroud 72 and the outer surface 82 of the inner shroud 78. The central slot 244 is generally radially centered in the vane 88 and each end of the central slot 244 has the arcuate end 218. The central slot 244 is angled in the concave side 208 from the leading edge portion 204 toward the trailing edge portion 206.

As a further alternative, any number of galleries can be formed. Thus, the cooling characteristic of each of the plurality of vanes 88 can be controlled by varying the means 230 for controlling the amount of cooling air and the means 213 for controlling the flow of mainstream hot gases into the galleries 212,230. For example, if the vanes 88 are too hot near the center, the flow of cooling air exiting within the center portion 203 of the vane 88 can be increased and the temperature near the center portion 203 can be reduced overcoming the heat related problem. As a further alternative if the vane is too cold, such as near the inner or outer should 78,72, the flow of mainstream hot gas can be increased and the first end portion 200 and the second end portion 202 near the inner and outer shroud 72,78 can be heated.

Thus, a means 250 for heating a portion of each of the plurality of vanes 88 and a means 252 for cooling a portion of each of the plurality of vanes 88 is provided. In this application, the means 250 for heating heats the first end portion 200 and the second end portion 202 of the individual vane 88. And, in this application, the means 252 for cooling cools the center portion 203 of the individual vane 88.

The slot 220 and/or pair of slots 242 and the slot 244 provide film cooling of the convex side 210 of the vane 88. The concave side 208 of the vane 88, in this application, has a layer of conventional thermal barrier coating applied thereto. Thus, the concave side 208 and the convex side 210 can withstand higher temperatures without failing.

Industrial Applicability

In use, the gas turbine engine 10 is started and allowed to warm up and is used in any suitable power application. As the demand for load or power is increased, the engine 10 output is increased by increasing the fuel and subsequent air resulting in the temperature within the engine 10 increasing. The components used to make up the turbine nozzle vane assembly 70 and the attachment components, being of different materials and having different rates of thermal expansion, grow at different rates and the forces resulting therefrom and acting thereon must be structurally compensated for to increase life and efficiency of the gas turbine engine. The structural arrangement of the turbine nozzle vane assembly 70 being made of a ceramic material requires that the turbine nozzle vane assembly 70 be generally isolated from the conventional materials and mounting designs. The structural characteristics of the vanes 88, being made of a ceramic material, further complicates the design since thermal stresses within the vane 88 must be compensated for to insure sufficient life of the components.

For example, the turbine nozzle vane assembly 70 which is in direct contact and aligned with the mainstream hot gases from the combustor 42 is suspended from the metallic components of the engine 10. The metallic stator diaphragm 158 is attached to the engine 10 in a conventional manner and the turbine nozzle vane assembly 70 is supported from the stator diaphragm 158. Thermal expansion in the radial direction is compensated for by allowing the cylindrical member 124 to move radially along the plurality of pins 150. Thus, as the turbine nozzle vane assembly 70 grows thermally in a generally radial direction the pins 150 retain the turbine nozzle vane assembly 70 axially between the outlet end 42 of the combustor 32 and the turbine assembly 64. As the turbine nozzle vane assembly 70 grows radially the interface of the transition portion 144 and the angled portion 166 tend to separate. However, axial growth of the stator diaphragm 158 being made of a metallic material has a higher rate of thermal expansion than the cylindrical ring 124 and grows more. Thus, a general contacting relationship is retained between the transition portion 144 and the angled portion 166 further stabilizing the axially position of the turbine nozzle vane assembly 70 between the outlet end 42 of the combustor 32 and the turbine assembly 64. Rotational movement of the turbine nozzle vane assembly 70 is compensated for by having each of the plurality of bosses 120 positioned in the corresponding one of the respective plurality of grooves 137. Thus, as the flow exits the combustor 32 and contacts the plurality of vanes 88 a resultant of force from the flow attempts to rotate the turbine nozzle vane assembly 70. The boss 120 and groove 137 arrangement prevents the rotation. Thus, the flow of hot gases are directed through the turbine nozzle vane assembly 70 against the turbine blades 68 driving the turbine assembly 64.

High thermal stresses within the vanes 88 have also been reduced. During operation, the inner and outer shrouds 78,72 remain cooler than the center portion of each of the plurality of vanes 88. Thus, the thermal expansion along the entire length of each of the plurality of vanes 88 differs depending on the temperature. Each of the first and second end portions 200,202 are attached to the outer and inner shrouds 72,78 respectively. The temperature at each of the first and second ends 200,202 is lower than in the center of the vane 88. Furthermore, each of the first and second ends 200,202 are restrained. Thus, the maximum expansion of each of the plurality of vanes 88 occurs near the center of each of the plurality of vanes intermediate the first and second ends 200,202. To compensate for the high thermal stresses generally near the middle of each of the plurality of vanes 88, the opening 214 and the slot 220 are positioned therein reducing the length along which the stress is active and the length of the resulting expansion.

In use, the mainstream hot gas enters the opening 214 which is located near the center of the vane 88, the position of the hottest flow of mainstream hot gas, and enters the first gallery 212. The hot gas travels radially along the first gallery 212 to the outer radial portion 222 and the inner radial portion 224 of the slot 220 and exit along the convex side 210 near the outer shroud 72 and the inner shroud 78. Thus, the cooler portion of the vane 88 is heated. Furthermore, cooling air from the compressor section 16 enters the second gallery 230 and exits the central radial portion 226 of the slot 220 along the center portion 203 of the vane 88, which is the hottest portion of the vane 88. Thus, the hottest portion of the vane 88 is cooled.

The application of heating and cooling respective portion of the vane 88 provides film heating and cooling of the trailing edge portions 206 further reduces the thermal stresses of each of the plurality of vanes 88 increasing the longevity and life of the ceramic turbine nozzle vane assembly 70. Thus, the local temperature variation along the entire length of the vane can be overcome and the temperature differential problem overcome.

The use of a continuous slot 220 extending between the outer shroud 72 and the inner shroud 78 verses a plurality of shorter slots 242,244 ending intermediate the outer shroud 72 and the inner shroud 78 reduces the number of ends and reduces the stress associated with an end. The continuous slot 220 does have a mixing of the hot gases and the cooling air along the pair of axial slots 226 whereas the plurality of shorter slots 242,244 are void of the mixing characteristics.

Thus, in view of the foregoing, it is readily apparent that the structure of the present invention results in the internal stress in the tensile stressed region of each of the plurality of vanes 88 being reduced. The general reduction of the tensile stresses reduces the possibility of catastrophic failure of each of the plurality of ceramic turbine nozzle vanes 88. Furthermore, the relative difference in thermal expansion between the metallic components and the ceramic components and the mounting therebetween has been compensated for by the generally slidable connection of the stator diaphragm 158, plurality of pins 150 and the cylindrical ring 124. Further thermal expansion and relative rotational forces have been compensated for by the slidable mounting of the plurality of bosses 120 in the plurality of grooves 137 in the cylindrical member 124.

Other aspects, objects and advantages of this invention can be obtained from a study of the drawings, the disclosure and the appended claims.

We claim:

1. A turbine nozzle vane assembly comprising:

an outer shroud defining an inner surface;

an inner shroud positioned radially within said outer shroud and defining a first end, a second end, an inner surface and an outer surface;

a plurality of nozzle vanes being interposed the inner surface of the outer shroud and the outer surface of the inner shroud, said plurality of vanes include a first end portion being attached to the inner surface of the outer shroud, a second end portion being attached to the outer surface of the inner shroud and said length of the slot extends the entire distance between said first end portion and said second end portion; and a slot being positioned in each of the plurality of nozzle vanes, said slot having a length extending axially between the inner surface of the outer shroud and the outer surface of the inner shroud and said slot has an arcuate end.

2. A turbine nozzle vane assembly comprising:

an outer shroud defining an inner surface;

an inner shroud positioned radially within said outer shroud and defining a first end, a second end, an inner surface and an outer surface;

a plurality of nozzle vanes being interposed the inner surface of the outer shroud and the outer surface of the inner shroud;

a slot being positioned in each of the plurality of nozzle vanes, said slot having a length extending axially between the inner surface of the outer shroud and the outer surface of the inner shroud;

a plurality of bosses being attached to the inner surface of the inner shroud intermediate said first end and said second end, each of said plurality of bosses having a generally rectangular cross-sectional configuration defining a plurality of sides; and a cylindrical member being positioned radially inwardly of the inner shroud, said cylindrical member including a first side, a second side, an outer surface defining a plurality of steps thereon and a plurality of grooves extending intermediate the first side and the second side corresponding in positional relationship to the plurality of bosses and having said plurality of bosses positioned in at least a portion of the plurality of grooves, said cylindrical member has a plurality of holes extending therethrough and a plurality of pins being positioned in corresponding ones of the plurality of through holes.

3. A turbine nozzle vane assembly comprising:

an outer shroud defining an inner surface;

an inner shroud positioned radially within said outer shroud and defining a first end, a second end, an inner surface and an outer surface;

a plurality of nozzle vanes being interposed the inner surface of the outer shroud and the outer surface of the inner shroud, each of said plurality of vanes include a leading edge portion, a trailing edge portion, a concave side, a convex side and each of said plurality of vanes have a first gallery and a second gallery therein and said concave side has an opening positioned therein being in communication with the first gallery and said convex side has said slot positioned therein; and a slot being positioned in each of the plurality of nozzle vanes, said slot having a length extending axially between the inner surface of the outer shroud and the outer surface of the inner shroud.

4. A turbine nozzle vane assembly comprising:

an outer shroud defining an inner surface;

an inner shroud positioned radially within said outer shroud and defining an outer surface;

a plurality of nozzle vanes defining a first end portion being attached to the inner surface of the outer shroud, a second end portion being attached to the outer surface of the inner shroud and a center portion defined between the first end portion and the second end portion;

means for heating said first end portion and said second end portion; and means for cooling said center portion.

5. The turbine nozzle vane assembly of claim 1 further including a plurality of bosses being attached to the inner surface of the inner shroud intermediate said first end and said second end, each of said plurality of bosses having a generally rectangular cross-sectional configuration defining a plurality of sides.

6. The turbine nozzle vane assembly of claim 5 further including a cylindrical member being positioned radially inwardly of the inner shroud, said cylindrical member including a first side, a second side, a plurality of steps defining an outer surface thereon and a plurality of grooves extending intermediate the first side and the second slide corresponding in positional relationship to the plurality of bosses and having said plurality of bosses positioned in at least a portion of the plurality of grooves.

7. The turbine nozzle vane assembly of claim 6 further including a plurality of segments, a continuous ring being positioned about the outer shroud, said continuous ring and said cylindrical member forming and retaining said plurality of segments into a ring shaped structure.

8. The turbine nozzle vane assembly of claim 2 wherein said outer surface of the cylindrical member further includes a first cylindrical portion extending from the first side toward the second side, a second cylindrical portion extending from the second side toward the first side and a transition portion connecting the first cylindrical portion with the second cylindrical portion.

9. The turbine nozzle vane assembly of claim 8 wherein said transition portion is angled from the first cylindrical portion outwardly toward the second cylindrical portion.

10. The turbine nozzle vane assembly of claim 1 wherein each of said plurality of vanes further include a leading edge portion, a trailing edge portion, a concave side, a convex side and a gallery being formed therein.

11. The turbine nozzle vane assembly of claim 10 wherein said convex side has said slot positioned therein.

12. The turbine nozzle vane assembly of claim 11 wherein said slot has an arcuate end.

13. The turbine nozzle vane assembly of claim 3 wherein said slot has an arcuate end.

14. The turbine nozzle vane assembly of claim 3 wherein said opening in the concave side is positioned nearer to the leading edge portion and said slot in the convex portion is positioned nearer to the trailing edge portion.

15. The turbine nozzle vane assembly of claim 3 wherein said slot has a portion thereof in communication with the first gallery and a portion thereof in communication with the second gallery.

16. The turbine nozzle vane assembly of claim 3 wherein said concave side has an opening therein being in communication with the first gallery and said convex side has a pair of radial slots positioned therein being in communication with the first gallery and a central slot positioned therein and being in communication with the second gallery.

17. The turbine nozzle vane assembly of claim 16 wherein said pair of radial slots and central slot have an arcuate end.

18. The turbine nozzle vane assembly of claim 3 wherein the first gallery includes means for controlling a flow of mainstream hot gas thereto when in use.

19. The turbine nozzle vane assembly of claim 3 wherein the second gallery includes means for controlling a flow of cooling air thereto when in use.

* * * * *

UNITED STATES PATENT AND TRADEMARK OFFICE
CERTIFICATE OF CORRECTION

PATENT NO. : 5,494,402

DATED : February 27, 1996

INVENTOR(S) : Boris Glezer, Hamid Bagheri, Aaron Fierstein

It is certified that error appears in the above-identified patent and that said Letters Patent is hereby corrected as shown below:

In Claim 4: Column 9, line 57 delete the comma after of. This error was made by the PTO.

In Claim 6: Column 10, line 11 delete "slide" insert "side". This error was made by the Applicant.

Signed and Sealed this

Seventeenth Day of December, 1996

Attest:

BRUCE LEHMAN

Attesting Officer

Commissioner of Patents and Trademarks